United States Patent
Hahn et al.

(10) Patent No.: US 12,437,020 B2
(45) Date of Patent: Oct. 7, 2025

(54) METHODS AND APPARATUS FOR KEYWORD ASSIGNMENT PREDICTIVE INTELLIGENCE MODELING

(71) Applicant: REVERSEADS PTE. LTD., Singapore (SG)

(72) Inventors: Michael Richard Hahn, Phuket (TH); Giacomo Colaianni, Muang Phuket (TH)

(73) Assignee: REVERSEADS PTE. LTD., Singapore (SG)

( * ) Notice: Subject to any disclaimer, the term of this patent is extended or adjusted under 35 U.S.C. 154(b) by 0 days.

(21) Appl. No.: 18/335,029

(22) Filed: Jun. 14, 2023

(65) Prior Publication Data
US 2024/0419752 A1    Dec. 19, 2024

(51) Int. Cl.
*G06F 16/00* (2019.01)
*G06F 16/9538* (2019.01)
*G06F 16/955* (2019.01)

(52) U.S. Cl.
CPC ...... *G06F 16/9566* (2019.01); *G06F 16/9538* (2019.01)

(58) Field of Classification Search
CPC .. G06F 16/2453; G06F 16/907; G06F 16/953; G06F 16/9535; G06F 8/77; G06F 11/1438; G06F 11/1441; G06F 16/00; G06F 16/1837; G06F 16/2428; G06F 16/275; G06F 16/285; G06F 16/3331; G06F 16/40; G06F 16/48; G06F 16/951; G06F 16/9536; G06F 16/9538; G06F 21/575; G06F 3/0482; G06F 8/61; G06F 8/65; G06F 9/4418; G06F 16/30; G06F 16/3328; G06F 16/3341; G06F 16/337; G06F 16/243; G06F 16/3325; G06F 16/355; G06Q 50/01; H04L 65/403; H04L 67/02; H04L 67/1095; H04L 67/1097; H04L 67/52; H04N 21/44226; H04N 21/4788; H04N 21/632; Y10S 707/917; Y10S 707/99942

See application file for complete search history.

(56) References Cited

U.S. PATENT DOCUMENTS

| | | | |
|---|---|---|---|
| 10,979,315 B1 | 4/2021 | Buxton et al. | |
| 2003/0088562 A1* | 5/2003 | Dillon | G06F 16/30 707/999.005 |

(Continued)

OTHER PUBLICATIONS

International Search Report and Written Opinion for Application No. PCT/US2024/032352, dated Jul. 23, 2024, 8 pgs.

(Continued)

*Primary Examiner* — Shyue Jiunn Hwa
(74) *Attorney, Agent, or Firm* — Kwan & Olynick LLP (57) ABSTRACT

In various implementations, a keyword assignment and predictive intelligence model scrapes content of web pages and stack ranks them according to a coordinates-based embedding system. The model further analyzes weblog data associated with user identifiers and stack ranks those user identifiers according to keywords associated with the weblog data. In particular embodiments, machine learning is applied to account for the entire web journey associated with the user identifiers associated with users, predicting future page URLs as well as content, products, services, information, etc., that the users may seek.

18 Claims, 7 Drawing Sheets

(56) References Cited

U.S. PATENT DOCUMENTS

| | | | |
|---|---|---|---|
| 2007/0033275 A1* | 2/2007 | Toivonen | G06F 16/9562 709/224 |
| 2014/0129942 A1* | 5/2014 | Rathod | H04N 21/44226 715/720 |
| 2014/0310688 A1 | 10/2014 | Granshaw et al. | |
| 2015/0106234 A1 | 4/2015 | Kamdar et al. | |
| 2024/0062021 A1 | 2/2024 | Tangari et al. | |

OTHER PUBLICATIONS

U.S. Appl. No. 18/619,854, USPTO e-Office Action: CTNF—Non-Final Rejection, Apr. 4, 2025, 20 pages. Available in Patent Center.

* cited by examiner

METHODS AND APPARATUS FOR KEYWORD ASSIGNMENT PREDICTIVE INTELLIGENCE MODELING

TECHNICAL FIELD

This disclosure generally relates to data mining and predictive analysis, and more specifically to keyword assignment and predictive intelligence modeling.

BACKGROUND

Computing systems currently have limited capabilities to analyze user behavior based on online interactions and predict user engagement and behavior. In some instances, systems will analyze the amount of time a viewer spends watching a video, the search terms a user enters into a search engine, or a user's past purchase history in order to serve additional videos, provide search results, or suggest a new product. Some of these mechanisms are limited to working within a particular provider's walled garden. For example, a purchase history at company A's property will allow company A to suggest subsequent products. Extensive viewing of particular videos at company B's property will allow company B to provide additional videos having similar content. All of these mechanisms are limited in their ability to use outside information or to provide outside entities with information. They further limit the ability to allow for predictive intelligence modeling, both inside and outside of a particular platform.

Mechanisms for managing privacy, abiding by governmental regulations, and tracking real time, current intentions of users also remain extremely limited.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Various embodiments disclosed herein provide the ability to identify devices and enable the providing of web content to such devices based on estimations of such devices' online behavior. More specifically, embodiments disclosed herein retrieve data associated width such devices and generate keyword and probability assignments for such devices. As will be discussed in greater detail below, such keyword and probability assignments may be used to formulate a prediction or estimation of a next action taken by a device. Accordingly, such predictions and estimations may be used to provide relevant web content to the device prior to such actions and in anticipation of such actions. In this way, a user associated with such a device may be provided with relevant web content specifically tailored to that user's particular navigation path on a particular website.

According to various embodiments, a keyword assignment model provided is a predictive intelligence mechanism that ingests user online data such as weblog data. Weblog data may include the number of user visits, visit duration, the number of page views, types of content accessed, entry and exit pages, file types, operating system used, browser used, keywords searched to find a website, as well as phrases searched within a website. In particular embodiments, the predictive intelligence model stack ranks user identifiers (IDs) and page uniform resource locators (URLs) by relevance for specific keywords. According to various embodiments, URLs are scraped for content and stack ranked according to specific keywords through a coordinates-based embedding system. This predictive intelligence model can create high-intent, in-market audiences for specific keywords corresponding to active users IDs. In particular embodiments, keywords may be assigned on many dimensions, such as: product vs service, travel vs non-travel, jobs vs non-jobs, etc., with coordinates that may vary from 0 to 1.

According to various embodiments, the predictive intelligence model system updates, refreshes, and optimizes user analysis data continuously, e.g. on an hourly basis, depending on user activities, creating an innovative online behavior predictive model that works on close-to-real-time user weblog data. The techniques of the present invention recognize significant benefits to continuously evaluating user behavior. In particular embodiments, the predictive intelligence model is also the first keyword-based audience categorization model that enables flexible data taxonomies and hourly data. According to various embodiments, the predictive intelligence model continuously assigns the highest probability keyword or keywords to multiple active users in order to anticipate behavior and match users potentially with entities that have selected those keywords as identifying users of interest. In particular embodiments, the predictive intelligence model is assigning the highest probability keywords that may correspond to content, services, products, solutions, or outcomes that the user may be consciously or subconsciously looking for at that particular moment in time.

In many examples, the predictive intelligence model further predicts future actions and behavior online by keyword road mapping to verify, validate, and potentially monetize existing probability keywords and additional predictions. The predictive intelligence model may use machine learning to analyze millions of examples of user behavior across numerous dimensions to identify additional activities the user may need to perform or additional information that the user may need to obtain. In some examples, high probability keywords identified for particular URLs are matched with corresponding high probability keywords as well as predicted road mapping keywords for particular users. Those particular users may be provided content, video clips, advertising, information, and offers associated with those particular URLs. High probability keywords and predicted road mapping keywords, or keywords associated with the users anticipated next set of actions, may be continuously updated.

In particular embodiments, the predictive intelligence model takes user activity data across one or more devices and stack ranks those user IDs by those keywords based on which pages they visit, taking into account the entire web journey of each user in order to stack rank them by relevant keywords, trying to predict what page URLs they will visit and what products, information, solutions, or services they may be interested in.

Figure 1:
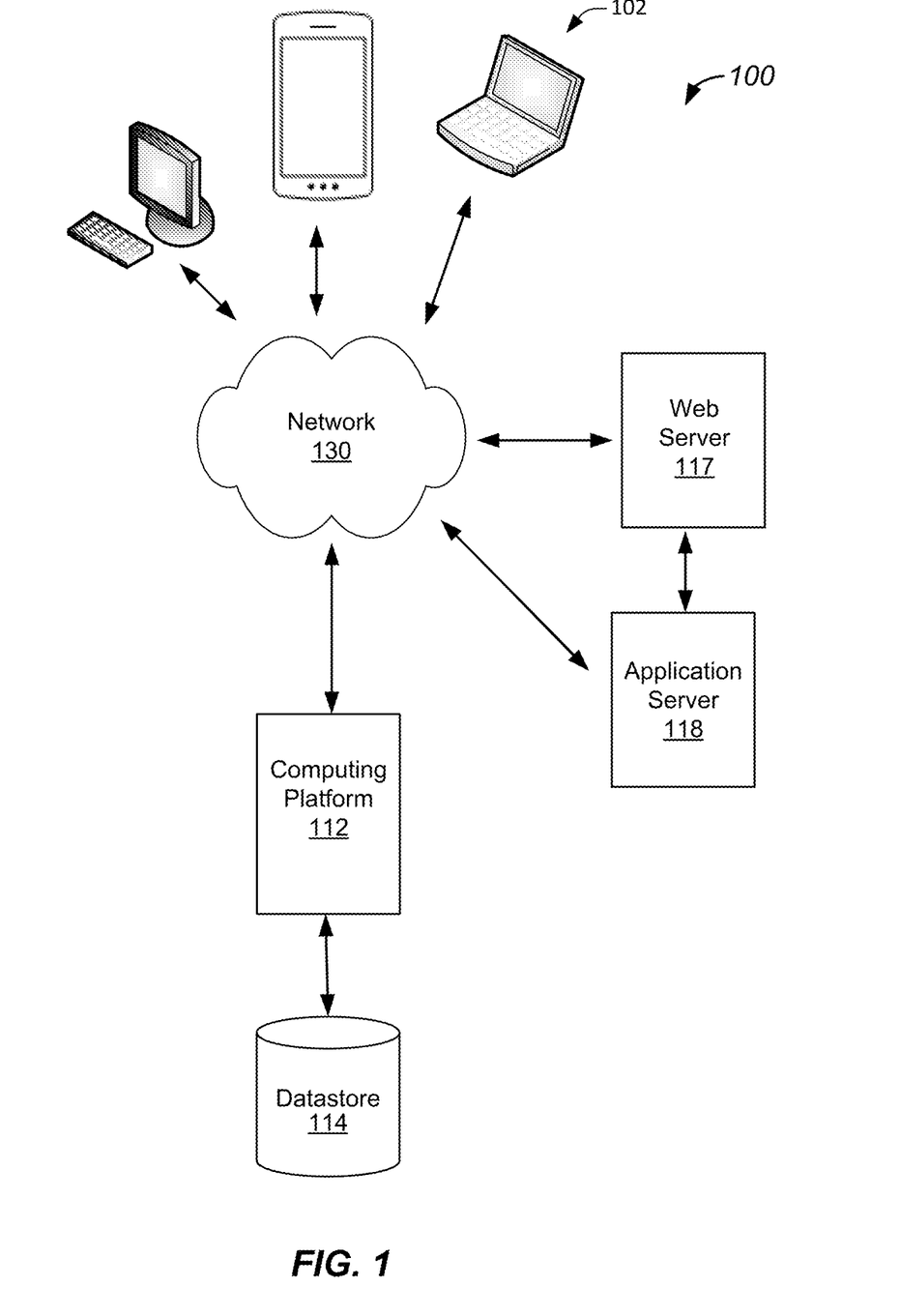
FIG. 1 illustrates an example of a system for keyword assignment predictive intelligence modeling in accordance with various embodiments.

FIG. 1 illustrates a diagram of an example of a system for device identification and keyword assignment, configured in accordance with some embodiments. As discussed above, users may use various devices, such as mobile communications devices, to interact with webpages and elements within webpages, as may occur as a user navigates a hierarchy of a webpage, or proceeds along a decision path of a webpage. As will be discussed in greater detail below, systems disclosed herein, such as system 100, may be configured to identify such devices and generate estimations and predictions of their behavior to facilitate the delivery of web content to the users in a predictive manner. In this way, devices may be identified, and content may be provided to them efficiently and intelligently as they progress through a decision path of a webpage.

System 100 may include various client machines, which may also be referred to herein as client devices, such as client machine 102. In various implementations, client machine 102 is a computing device accessible by a user. For example, client machine 102 may be a desktop computer, a laptop computer, a mobile computing device such as a smartphone, or any other suitable computing device. Accordingly, client machine 102 includes one or more input and display devices, and is communicatively coupled to communications network 130, such as the internet. In various implementations, client machine 102 comprises one or more processors configured to execute one or more applications that may utilize a user interface. Accordingly, a user may request and view various different display screens associated with such applications via client machine 102. In various implementations, a user interface may be used to present the display screen to the user, as well as receive one or more inputs from the user. In some implementations, client machine 102 may be used to implement a web browser or a standalone locally executed application. Accordingly, users may use client machine 102 to interact with webpages, and click on data objects included in webpages.

System 100 further includes web server 117 which may be configured to serve webpages to various client machines, such as client machine 102. Accordingly, web server 117 is configured to support one or more communications protocols to handle queries from client machine 102 and to obtain and serve web content to client machine 102. For example, such web content may be one or more webpages that each include various data objects displayed to the user as the user interacts with and navigates a webpage. In some embodiments, system 100 also includes application server 118 that is configured to provide content that may be served to client machine 102 via network 130. For example, application server 118 may provide one or more data objects, such as interactive images, videos, or other data objects, that may be included in a webpage provided to a user via client machine 102. In various embodiments, such data objects may convey various information related to one or more actions the user is taking, such as clicking on a button of a webpage or entering information in a data field. The data objects may also convey information associated with a type of webpage that is being viewed by the user, such as a sports webpage or a shopping webpage. While FIG. 1 illustrates one application server 118 and web server 117, it will be appreciated that system 100 may include any number of web servers and application servers.

System 100 may additionally include computing platform 112 that is configured to identify devices, such as client machine 102, and additionally, to intelligently predict behavior of such devices as users associated with the devices progress through decision paths of the webpage. As will be discussed in greater detail below, computing platform 112 may be configured to identify devices using device identifiers, and also to assign such devices keywords and associated probabilities. Accordingly, the stored keywords and probabilities determined for a particular device may identify one or more aspects of a next action taken by the user of the device, as well as a probability of such a next action occurring. In some embodiments, the keyword may be used to identify a type of next action, and may also be used to identify a data object to be provided to the user in anticipation of that next action.

Moreover, as will be discussed in greater detail below, such device identification may be implemented in the context of secure computing environments where action histories or previous data events might not be available. For example, a user may have been interacting with a webpage in a secure computing environment other than computing platform 112, and such interactions might not be visible to computing platform 112. In various embodiments, computing platform 112 may detect the user and associated client machine leaving that secure computing environment, by for example, switching applications or browsers, and may use additional aggregated data to compensate, at least in part, for the inaccessible interaction data retained in the secure computing environment. Additional details regarding computing platforms are discussed in greater detail below. System 100 further includes datastore 114 that may store data associated with computing platform 112. Accordingly, datastore 114 may be a database system or a distributed file storage system that may be included within computing platform 112 or may be implemented separately.

Figure 2:
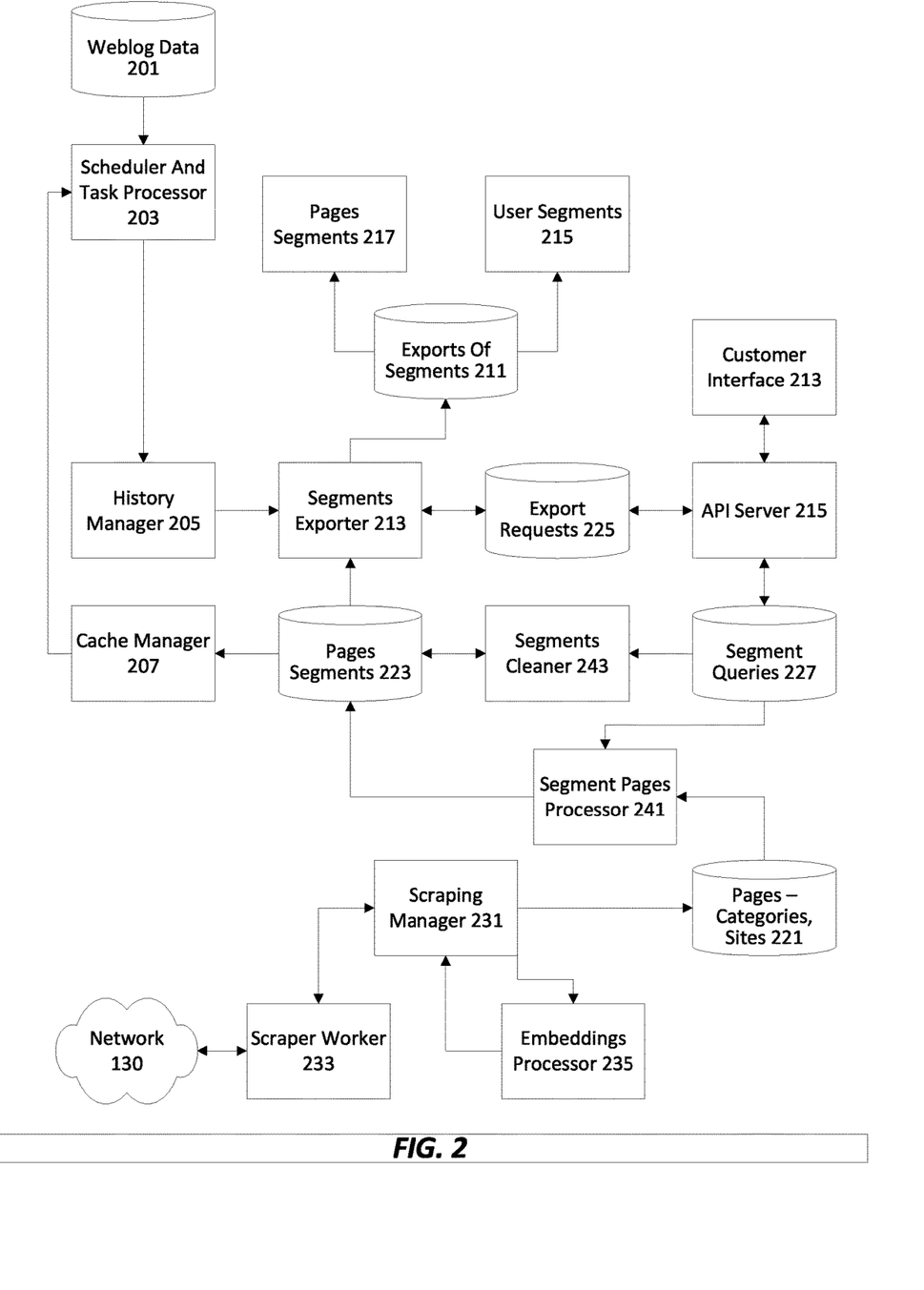
FIG. 2 illustrates another example of a system for keyword assignment predictive intelligence modeling in accordance with various embodiments.

FIG. 2 illustrates an example of a system for keyword assignment predictive intelligence modeling in accordance with various embodiments. According to various implementations, web content such as weblog data 201 is obtained regularly by a scheduler and task processor 203. Weblog data may include all data generated by a web server as a result of interactions with visitors to the website. Weblog data may include user identifiers, IP addresses, time stamps, access requests, amount of data transferred, URL that referred the request, device type, algorithms used, as well as additional parameters associated with the visitor or device. In particular embodiments, weblog data 201 is obtained hourly by the scheduler and task processor 203. The scheduler and task processor 203 may include a history scheduler and one or more history processors. The scheduler and task processor 203 checks for new files and schedules them for processing, processes history files, and collects user identifiers for active segments. In particular embodiments, keywords or groups or keywords and associated parameters are referred to herein as segments.

According to various embodiments, the scheduler and task processor 203 checks if URLs are available in cache associated with a cache manager 207. If URLs are not available in cache associated with a cache manager 207, the scheduler and task processor sends those URLs not found in cache to a scraping manager 231. According to various embodiments, the keyword and predictive intelligence model takes weblog data of users' devices and stack ranks those user IDs by those keywords based on which pages visited. A machine learning model takes into account the entire web journey of each user in order to stack rank them by relevant keywords, trying to predict what page URLs they will visit and what information, solutions, products, or services they will be in-market for next.

According to various embodiments, the scraping manager 231 is associated with multiple scraper workers 233 that have access to a network 130 such as the Internet. A scraping manager 231 may orchestrate all aspects of the scraping process including checking if a page was already scraped in a pages, categories, and sites database 221. If the page has not already been scraped or has not been recently scraped based on a time period threshold, the scraping manager 231 sends URLs to be scraped to the scraper workers 233. The scraper workers 233 parse and scrape webpages to extract text from them. The scraped pages and scraping results are sent back to the scraping manager 231. In particular embodiments, the scraping manager 231 is also connected to one or more embeddings processors 235. According to various embodiments, the embeddings processors 235 compute embeddings for texts from webpages. Computed embeddings may be sent back as results to scraping manager 231.

In particular embodiments, the scraping manager 231 sends scraped pages and their embeddings to the pages, categories, and sites database 221 for storage and use by a segment pages processor 241, which periodically checks new pages and determines if they fit into any active segment. According to various embodiments, the model scrapes the content of web pages on the Internet and stack ranks them according to specific keywords through a coordinates-based embedding system. Keywords may be assigned on many dimensions, such as professional vs recreational, domestic vs foreign, product vs service, entertainment vs informational, etc. In particular embodiments, coordinates vary from 0 to 1.

The segment pages processor 241 is connected to a segment queries database 227 that is configured to hold current campaigns or segments and their keywords or queries. The segment queries database 227 may also hold parameters for segment. According to various embodiments, segments correspond to keywords and parameters such as threshold, size limitations, user time-to-live, user time-to-idle, etc. In particular embodiments, segments are associated with specific keywords or phrases. Segments and segment queries may be obtained through an API Server 215 connected to a customer interface 213. According to various embodiments, the customer interface 213 may be a search or reverse search platform allowing entities to connect with users having the same input segments or keywords or search terms. In some examples, user keywords may be determined after processing weblog data in order to match users with content of interest such as news, marketing, advertising, and product and service offers, information, bulletins, etc.

In particular embodiments, the segment pages processor 241 periodically checks new pages and determines if they fit any active segment by connecting to the segment queries database 227. The segments pages processor 241 provides pages segments to pages segments database 223. According to various embodiments, the cache manager 207 identifies pages which belong to active campaigns and deserve to be placed in cache from the pages segments database 223. In particular embodiments, the cache manager 207 periodically updates cache and fills it with the most relevant pages from active segments. The pages segments database 223 is also connected to segments exporter 213. The segments exporter 213 requests to export segments in a specified format. The segments exporter 213 also receives user segments from a history manager 205 as well as a pages segments database 223.

A history manager 205 may process history files, collect user identifiers for active segments, and determine if URLs are available. In particular embodiments, the segments exporter 213 exports segments to segments database 211, that provides pages segments 217 and user segments 215.

Figure 3:
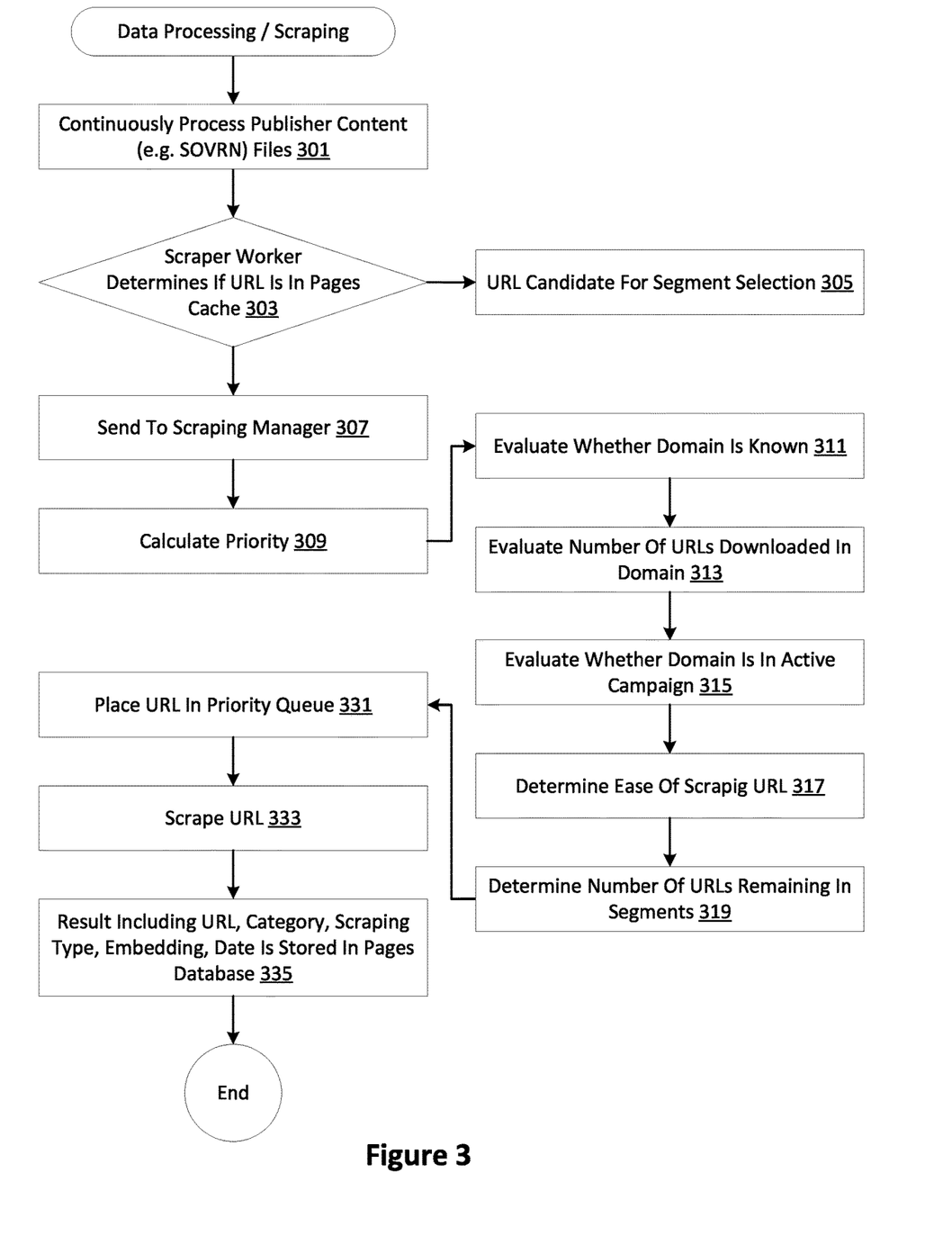
FIG. 3 illustrates an example of data processing and scraping in accordance with various embodiments.

FIG. 3 illustrates an example of data processing and scraping in accordance with various embodiments. In particular embodiments, publisher content is continuously processed at 301. In some examples, thousands of Sovrn files are processed each hour. Tasks may be handled by a queue that sends them to scraper workers. At 303, a scraper worker determines if a particular URL is in pages cache 303. If the URL is in pages cache, the URL is a candidate for segment selection at 305. If the URL is not in pages cache at 303, the URL is sent to a scraping manager 307. According to various embodiments, the URL is sent to a scraping manager with a Sovrn category where it is excluded if it was downloaded before. At 309, priority is calculated by applying multiple factors. In particular embodiments, the URL is parsed and evaluated to determine whether the domain is known at 311. This may involve accessing cache or storage. At 313, the number of URLs downloaded in the domain is evaluated. In particular embodiments, the number of URLs downloaded in the category is also determined.

At 315, it is determined if the domain is in an active campaign. At 317, the difficulty of scraping the URL is determined. The number of URLs remaining in segments is determined at 319.

According to various embodiments, the URL is placed in a priority queue 331. At 333, the content associated with the URL is scraped at 333. In some examples, failed URLs are stored for further analysis while successful URLs are sent for embedding calculations. At 335, the result including the URL, category, scraping type, embedding, date, etc., is stored in the pages database 335.

Figure 4:
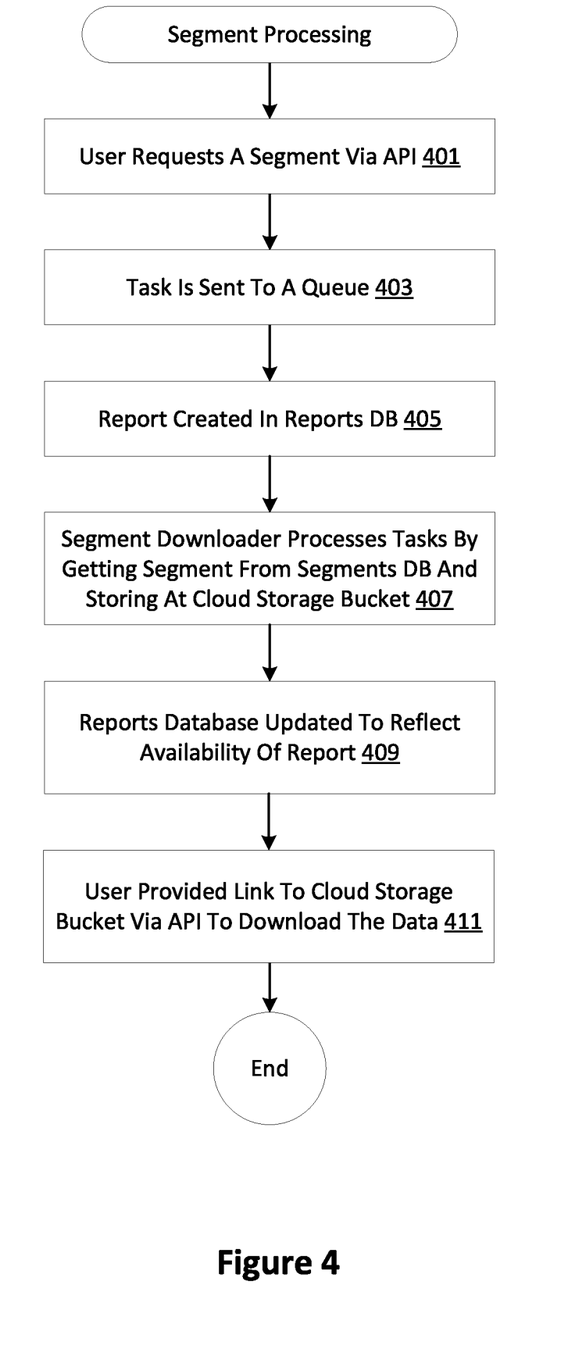
FIG. 4 illustrates an example of segment processing in accordance with various embodiments.

FIG. 4 illustrates an example of segment processing in accordance with various embodiments. According to various embodiments, a user requests a segment via an API at 401. The user may be a person or entity seeking to find content consumers, advertising targets, interest group participants, clients for a particular service, or just generally individuals or entities that the user may wish to engage with. A segment may be associated with one or more keywords as well as parameters corresponding to the one or more keywords. Parameters may include threshold, size limitations, user time-to-live, user time-to-idle, etc. The task is sent to a queue at 403. According to various embodiments, a report is created in a reports database at 405. In particular embodiments, the segment downloader processes the task and other tasks by obtaining the segment from a segments database and storing the segment at a cloud storage bucket at 407. At 409, a reports database is updated to reflect availability of the report.

Figure 5:
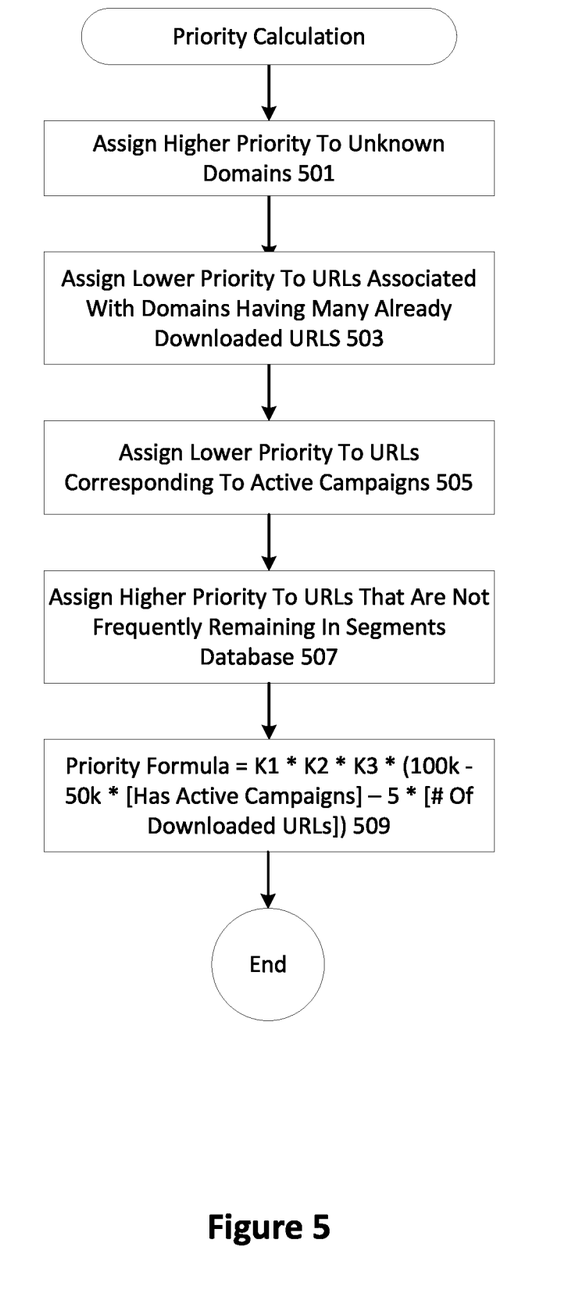
FIG. 5 illustrates an example of a priority calculation in accordance with some embodiments.

FIG. 5 illustrates an example of a priority calculation in accordance with some embodiments. According to various embodiments, a higher priority is assigned to unknown domains at 501. Unknown domains will be scraped sooner. At 503, a lower priority is assigned to URLs associated with domain having many already downloaded URLs. According to various embodiments, lower priority is assigned to URLs corresponding to active campaigns at 505. According to various embodiments, higher priority is assigned to URLs that are not frequently remaining in a segments database 507. According to various embodiments, the priority formula at 509 is K1*K2*K3*(100 k−50 k*[Has Active Campaigns]−5*[#Of Downloaded URLs]) 509. In particular embodiments, K1=scraping value, where 5 is regular, 3 is proxy, and 1 is cloud platform or cloudflare. K2=average segment filling=1−Fill/10, e.g. 50%=1−0.5=0.5. K3=URL type, where 4 is path, 1.5 is URL, and 1 is domain. For unknown domains, the value may be set as 5*1*K3*100K.

Figure 6:
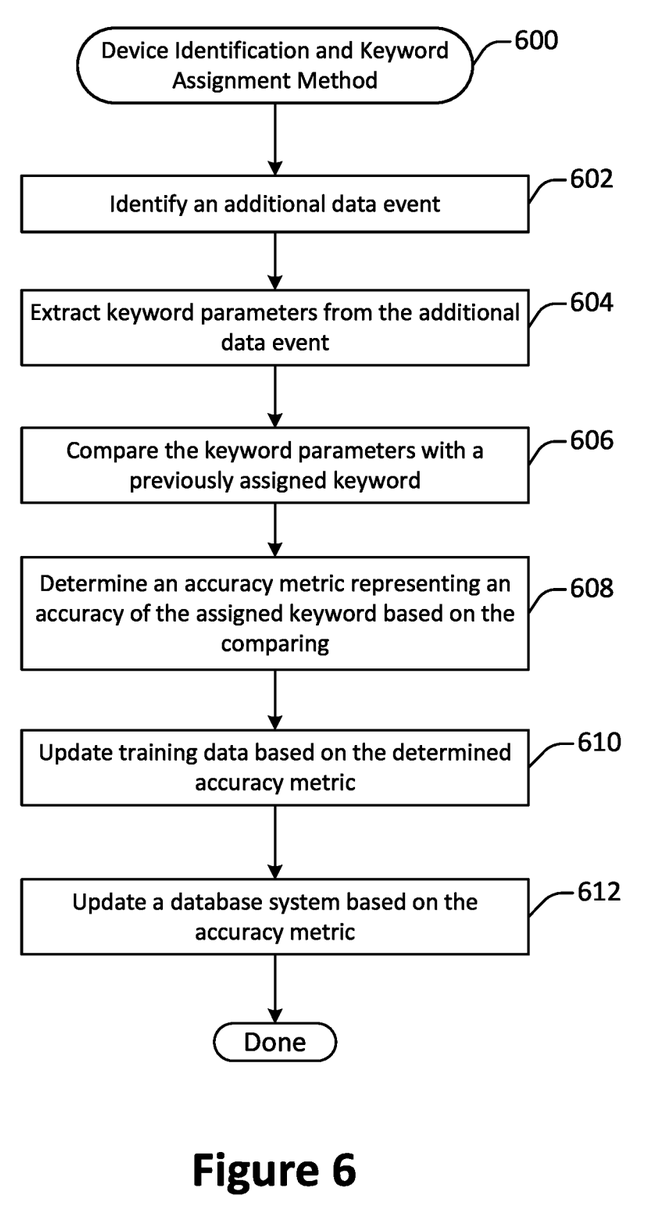
FIG. 6 illustrates an example of device identification and keyword assignment, configured in accordance with some embodiments.

FIG. 6 illustrates a flow chart of an additional example of a method for device identification and keyword assignment, configured in accordance with some embodiments. As similarly discussed above, data events associated with devices may be aggregated and used to generate predictive keywords and probability metrics for those devices. As will be discussed in greater detail below, methods disclosed herein, such as method 600, may be used to implement validation operations to increase the accuracy of device behavior prediction.

Accordingly, method 600 may commence with operation 602 during which an additional data event may be identified. As similarly discussed above, an additional data event may be received subsequent to an initial assignment of a keyword to a particular device identifier associated with a client machine. More specifically, a user associated with a client machine may take another action and interact with another webpage. The interaction may be logged as a data event and received at a data source, such as a third-party data provider. The additional data event may then be converted to a structured data object and stored in a datastore.

Method 600 may proceed to operation 604 during which keyword parameters may be extracted from the additional data event. As noted above, the additional data event may be converted to a structured data object, and one or more keywords may be extracted from the structured data object. In this way, one or more keywords may be identified for the additional data event, and the one or more keywords may be stored as keyword parameters.

Method 600 may proceed to operation 606 during which the keyword parameters may be compared with a previously assigned keyword. Accordingly, the keyword parameters may be compared with the previously assigned keyword to see if the keywords match. As similarly discussed above, assigned keywords may be compared against a keyword included in the additional data event, and it may be determined if they match. As will be discussed in greater detail below, one or more accuracy metrics may be generated based on the result of the comparison, as well as the identification of one or more types of errors, as discussed above.

Method 600 may proceed to operation 608 during which an accuracy metric may be determined. In various embodiments, the accuracy metric represents an accuracy of the previously assigned keyword. As similarly discussed above, the accuracy metric may be s a similarity score generated based on a determination of an amount of similarity between the previously assigned keyword and the new keyword parameters. Accordingly, semantic or natural language processing techniques may be implemented to characterize a similarly between one or more new keywords and one or more assigned keywords. In some embodiments, the similarity score may be a numerical score or may be some other indicator, such as a flag.

Method 600 may proceed to operation 610 during which training data may be updated. As discussed above, training data associated with one or more machine learning algorithms may be updated by being fed the most recent results. As also discussed above, such training data may be stored in the context of a distributed file system, and the updating of the training data may modify or adjust the one or more machine learning algorithms to ensure the determination of probability metrics is implemented based on the most recent and accurate data.

Method 600 may proceed to operation 612 during which a database system may be updated. Accordingly, a data storage system of the computing platform may be update to store the newly updated training data, the accuracy metric, as well as any updates made to the assigned keyword for the client machine associated with the additional data event. It will be appreciated that method 600 may be implemented periodically such that assigned keywords are periodically and automatically updated. In some embodiments, method 600 may be implemented responsive to one or more conditions, such as detection of a data ingestion event. Accordingly, method 600 may be triggered when new data is received from a data source.

Figure 7:
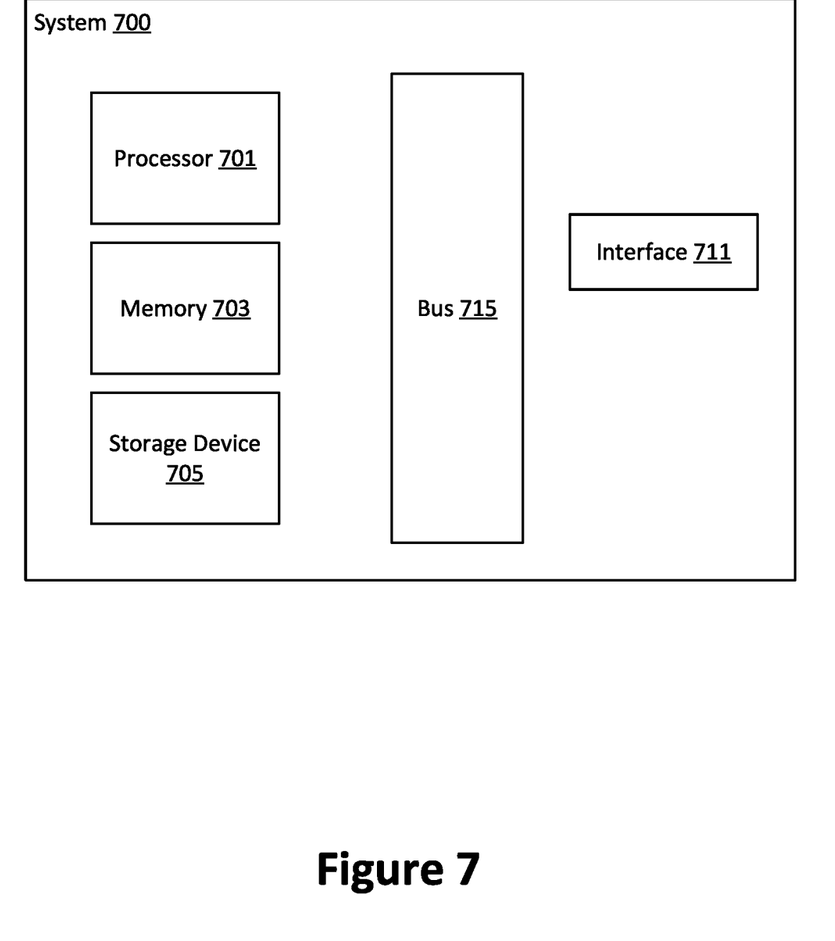
FIG. 7 illustrates one example of a computing device.

FIG. 7 illustrates one example of a computing device, configured in accordance with some embodiments. According to various embodiments, system 700 suitable for implementing embodiments described herein includes a processor 701, a memory module 703, a storage device 705, an interface 711, and a bus 715 (e.g., a PCI bus or other interconnection fabric.) System 700 may operate as variety of devices such as an application server, a web server, or any other device or service described herein. Although a particular configuration is described, a variety of alternative configurations are possible. The processor 701 may perform operations such as those described herein. Instructions for performing such operations may be embodied in the memory 703, on one or more non-transitory computer readable media, or on some other storage device. Various specially configured devices can also be used in place of or in addition to the processor 701. The interface 711 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD);

magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some implementations include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities. Accordingly, Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
   scraping content associated with a plurality of page uniform resource locators (URLs);
   analyzing the plurality of page URLs to stack rank the plurality of page URLs according to a plurality of page URL keywords having a plurality of dimensions;
   obtaining activity data including weblog data of a plurality of user devices corresponding to a plurality of user identifiers, the weblog data obtained from a plurality of sources including a plurality of web servers;
   analyzing the activity data to stack rank the plurality of user identifiers according to a plurality of user identifier keywords having the plurality of dimensions, wherein the activity data is continuously analyzed to update the stack rank of the user identifiers according to the plurality of the user identifier keywords as well as to develop a stack rank of the user identifiers according to a plurality of user road mapping keywords, the plurality of user road mapping keywords used to predict the page URLs that the plurality of user identifiers will visit.

2. The method of claim 1, wherein the plurality of page URL keywords are associated with the plurality of user road mapping keywords to match users with content of interest.

3. The method of claim 1, wherein scraping content associated with the plurality of page URLs comprises checking pages cache for a URL, applying a priority formula, and storing a result in a pages database.

4. The method of claim 1, wherein a priority formula evaluates whether a domain of the URL is known or unknown.

5. The method of claim 1, wherein a priority formula evaluates how many URLs were downloaded from a same domain.

6. The method of claim 1, wherein a priority formula evaluates whether a domain is associated with an active campaign.

7. The method of claim 1, wherein URLs associated with unknown domains and having a type of path have higher priority.

8. The method of claim 1, wherein a plurality of priority formula factors in scraping type, average segment filling, URL type, whether a domain has active campaigns, and a number of downloaded URLs for the domain.

9. A system comprising:
   an scraping manager configured to obtain and scrape content associated with a plurality of page uniform resource locators (URLs);
   a processor configured to analyze the plurality of page URLs to stack rank the plurality of page URLs according to a plurality of page URL keywords having a plurality of dimensions;
   a scheduler and task processor configured to obtaining activity data including weblog data of a plurality of user devices corresponding to a plurality of user identifiers, the weblog data obtained from a plurality of sources including a plurality of web servers;
   wherein the activity data is analyzed to stack rank the plurality of user identifiers according to a plurality of user identifier keywords having the plurality of dimensions, wherein the activity data is continuously analyzed to update the stack rank of the user identifiers according to the plurality of the user identifier keywords as well as to develop a stack rank of the user identifiers according to a plurality of user road mapping keywords, the plurality of user road mapping keywords used to predict the page URLs that the plurality of user identifiers will visit.

10. The system of claim 9, wherein the plurality of page URL keywords are associated with the plurality of user road mapping keywords to match users with content of interest.

11. The system of claim 9, wherein scraping content associated with the plurality of page URLs comprises checking pages cache for a URL, applying a priority formula, and storing a result in a pages database.

12. The system of claim 9, wherein a priority formula evaluates whether a domain of the URL is known or unknown.

13. The system of claim 9, wherein a priority formula evaluates how many URLs were downloaded from a same domain.

14. The system of claim 9, wherein a priority formula evaluates whether a domain is associated with an active campaign.

15. The system of claim 9, wherein URLs associated with unknown domains and having a type of path have higher priority.

16. The system of claim 9, wherein a plurality of priority formula factors in scraping type, average segment filling, URL type, whether a domain has active campaigns, and a number of downloaded URLs for the domain.

17. A computer readable medium comprising:
   computer code for scraping content associated with a plurality of page uniform resource locators (URLs);
   computer code for analyzing the plurality of page URLs to stack rank the plurality of page URLs according to a plurality of page URL keywords having a plurality of dimensions;
   computer code for obtaining activity data including weblog data of a plurality of user devices corresponding to a plurality of user identifiers, the weblog data obtained from a plurality of sources including a plurality of web servers;
   computer code analyzing the activity data to stack rank the plurality of user identifiers according to a plurality of user identifier keywords having the plurality of dimensions, wherein the activity data is continuously analyzed to update the stack rank of the user identifiers according to the plurality of the user identifier keywords as well as to develop a stack rank of the user identifiers according to a plurality of user road mapping keywords, the plurality of user road mapping keywords used to predict the page URLs that the plurality of user identifiers will visit.

18. The computer readable medium of claim 17, wherein the plurality of page URL keywords are associated with the plurality of user road mapping keywords to match users with content of interest.

* * * * *